United States Patent
Woodward, Jr.

(10) Patent No.: US 7,376,158 B2
(45) Date of Patent: May 20, 2008

(54) RATE LIMITED CONTROL MECHANISM FOR MPEG PCR DEJITTERING

(75) Inventor: William D. Woodward, Jr., Lilburn, GA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 994 days.

(21) Appl. No.: 10/829,568

(22) Filed: Apr. 22, 2004

(65) Prior Publication Data

US 2005/0238061 A1    Oct. 27, 2005

(51) Int. Cl.
  *H04J 3/06* (2006.01)
(52) U.S. Cl. ........................................... 370/516
(58) Field of Classification Search ............... 370/232, 370/233, 234, 350, 395.64, 395.65, 503, 370/516, 517, 518, 519, 538, 540, 544, 914
  See application file for complete search history.

(56) References Cited

U.S. PATENT DOCUMENTS

| | | | |
|---|---|---|---|
| 5,184,350 A * | 2/1993 | Dara | 370/466 |
| 5,640,388 A | 6/1997 | Woodhead et al. | 370/468 |
| 2002/0024970 A1 | 2/2002 | Amaral et al. | 370/468 |

FOREIGN PATENT DOCUMENTS

EP    0 778 710    7/1997

OTHER PUBLICATIONS

Scientific-Atlanta, Inc. Pending Patent Application, U.S. Appl. No. 10/797,227, filed Mar. 10, 2004, entitled "Transport Stream Dejitterer," Inventors: William D. Woodward, Jr. and Howard G. Pinder.
Jittering Smoothing and Traffic Modeling for MPEG-2 Video Transport over ATM Networks Claims 1-20 vol. 9. No. 5 pp. 332-339, 1998—Wenwu, Zhu, Yao Wang, Ya-Qin Zhang International Journal of Imaging Systems and Technology.
A Restamping Approach to Clock Recovery in MPEG-2 Systems Layer—Claims 1-20—vol. 2, pp. 1285-1290, Jun. 6, 1999—IEEE Internations Conference on Communications—NY.
Dejittering in the Transport of MPEG-2 and MPEG-4 Video—Claims 1-20 vol. 8, No. 3—p. 233, 235, Oct. 23, 2000—Mulit Media System Springer-Verlag Germany.

* cited by examiner

*Primary Examiner*—Chirag G Shah
*Assistant Examiner*—Ashley L Shivers

(57) ABSTRACT

A system and method for guaranteeing an upper bound on output jitter while maintaining maximum loop bandwidth. At least a portion of a plurality of transport packets stored in a buffer include a first timestamp value. A first phase locked loop receives a stream of first timestamp values and generates a variable rate timing signal stream that conveys a variation rate and a phase accumulation rate of the stream of first timestamp values to the first loop. A second phase locked loop receives the variable rate timing signal stream and generates a stable rate timing signal stream conveying the average rate of the variable rate timing signal stream. A interval timer is responsive to the stable rate timing signal stream in order to release the transport packets from the buffer.

20 Claims, 4 Drawing Sheets

RATE LIMITED CONTROL MECHANISM FOR MPEG PCR DEJITTERING

TECHNICAL FIELD

The present invention relates to digital transmission systems, and more particularly to a method and system for removing jitter from transmitted packets subjected to delays, and for correcting timestamps in selected packets to accurately reflect the temporal location of selected packets relative to other packets.

BACKGROUND OF THE INVENTION

The MPEG-2 Systems standard provides a syntax and a set of semantic rules for the construction of bitstreams containing a multiplexed combination of one or more related programs. Each program is composed of one or more related elementary streams representing video, audio or other data streams that share a common time base of the program they are associated with. The coded data for a video, audio or other data stream is packetized to form a packetized elementary stream. The transport stream protocol provides a standard format for combining one or more packetized elementary streams into a single transport stream that may then be transmitted over a medium.

A transport stream comprises a continuous sequence of transport packets carrying data from one of the packetized elementary streams. Prior to transmitting the transport stream, an encoder employs a system clock to timestamp the transport packets. A decoder receiving the transport stream permits one or more of the packetized elementary streams to be extracted from the transport stream by simply extracting every incoming packet whose header includes a program identifier assigned to the selected packetized elementary streams. Decoders receiving the transport stream utilize a corresponding system clock whose frequency of operation matches the encoder. However, the decoder system clock typically will need synchronizing with the encoder system clock.

Program Clock References (PCRs) are counter values from the encoder's system clock that are inserted into the transport packets. The PCRs inserted into the transport packets represent the time which the PCR's were inserted into the transport packets and, therefore, reflect the true time base of a particular program. Each program has its own independent time base. Each particular timestamp value represents a clock value at the time of the insertion indicative of an optimal time relationship between the payload data of the particular data packet and the payload data of prior and subsequent data packets.

Prior to transmitting a transport stream from a headend through a network to subscribers, the arrival time of packets becomes corrupted which introduces error known as jitter. The PCRs no longer accurately reflect the time base of a selected program since the packet containing the PCR arrived at the wrong time. In such case, the PCRs and the packet transmission time must be adjusted before the packet leaves the headend in order to allow the decoder to re-establish the original time base of the selected program.

Typically, type II digital phase locked loops are utilized to recover and suppress the jitter in the PCR from an MPEG transport stream. However, it is desirable to have an upper bound on output PCR jitter from a PCR dejitter algorithm. For example, a PCR jitter upper bound of no more than 500 nanoseconds is desirable. It is difficult to guarantee meeting such an upper bound for limiting PCR jitter with known digital phase locked loop systems.

Multiple cascaded phase locked loops can be utilized to suppress time base jitter. A phase locked loop provides a low pass filter function to the jitter components. This allows the jitter suppression at specific frequencies to be specified. Since the spectral components of the input jitter are not known, it is not possible to know how much overall jitter suppression will be achieved.

Therefore, simply cascading multiple phase locked loops cannot guarantee an upper bound on output PCR jitter from a PCR dejitter algorithm unless an extremely low bandwidth system is used. However, in most cases, such a low bandwidth system would be impractical because it would not be able to respond quickly enough to source clock rate changes caused by switching to a different MPEG source. What is needed is a method and system for dejittering an MPEG transport stream that guarantees an upper bound on output PCR jitter from a PCR degittering algorithm while maintaining maximum system bandwidth.

BRIEF DISCRIPTION OF THE DRAWINGS

DETAILED DESCRIPTION

The present invention will be described more fully hereinafter with reference to the accompanying drawings in which like numerals represent like elements throughout the several figures, and in which an exemplary embodiment of the invention is shown. This invention may, however, be embodied in many different forms and should not be construed as being limited to the embodiments set forth herein; rather, the embodiments are provided so that this disclosure will be thorough and complete, and will fully convey the scope of the invention to those skilled in the art. The present invention is described more fully hereinbelow.

One embodiment of the present invention may be implemented in the context of a subscriber television system (STS) as hardware, software, firmware, or a combination thereof. For example, the present invention in the context of an STS is implemented in software or firmware that is stored in memory and that is executable by a suitable execution system. If implemented in hardware, the present invention can be implemented with any technology known by those skilled in the art.

An STS may be configured in many different ways, but generally includes a network interposed between a headend and a plurality of digital subscriber communication terminal (DSCTs). The DSCT located at a subscriber's premises provides an interface between the headend and the subscriber. The headend receives and processes programming signals from content providers. In one embodiment, the headend transmits digital signals in MPEG format. However, the embodiments described herein employing MPEG packets is for exemplary purposes and is not limiting the scope of the present invention. The scope of the present invention includes all streams of information where jitter is removed. The STS may include additional components or include systems that forgo utilizing physical structured cabling for transmission such as satellite systems.

Figure 1:
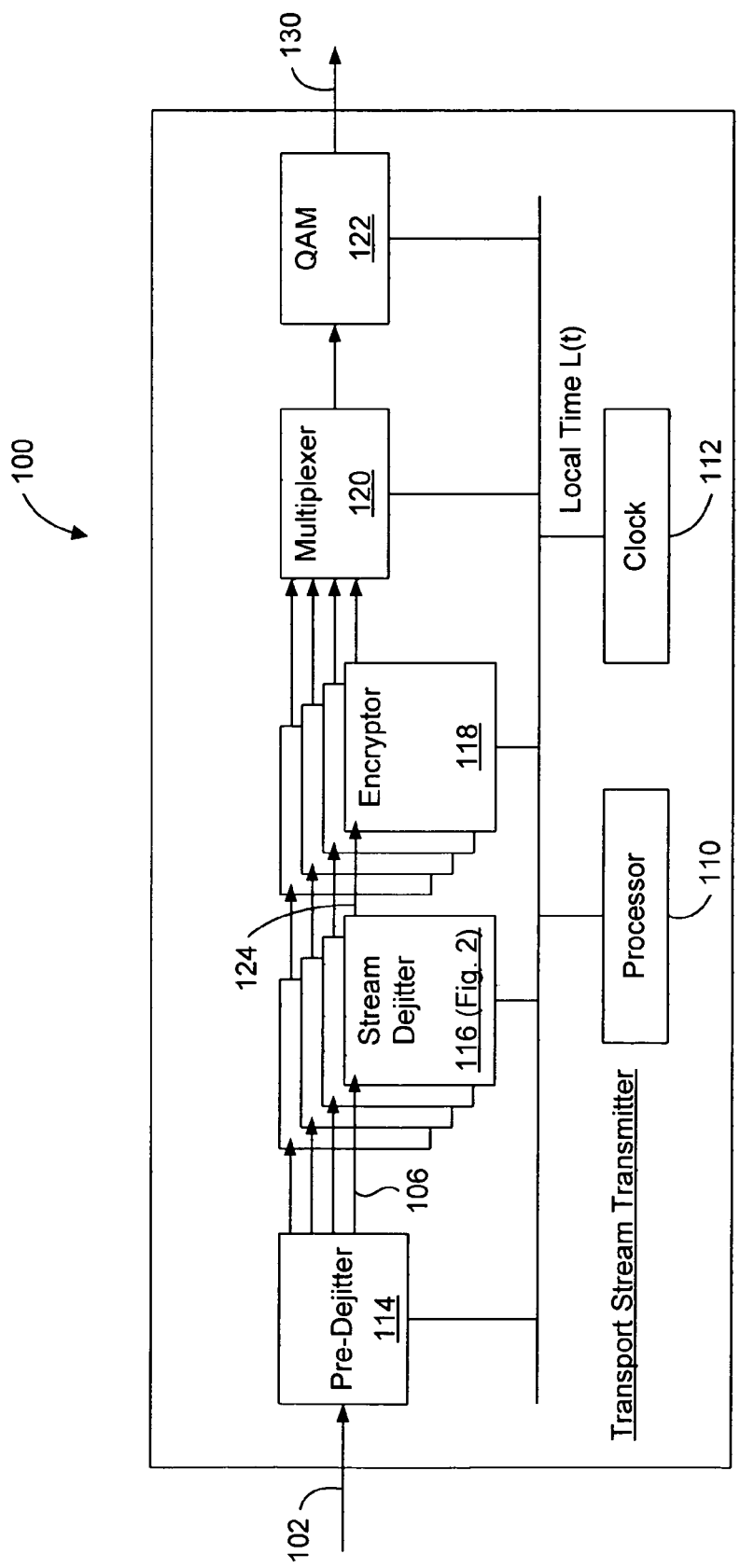
FIG. 1 illustrates one embodiment of a transport stream transmitter of the present invention.
Figure 2:
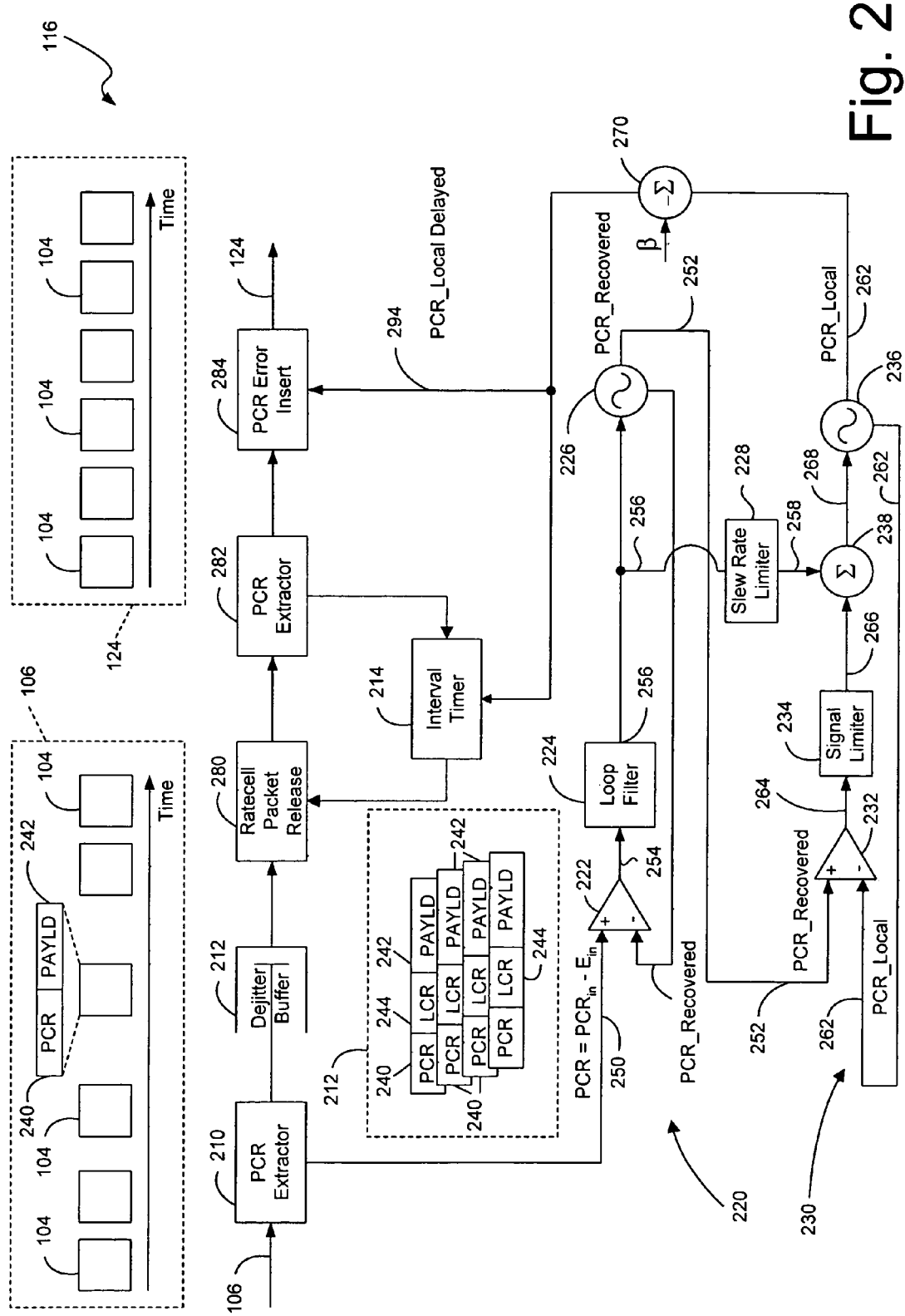
FIG. 2 illustrates one embodiment of a stream dejitter of the transport stream transmitter of FIG. 1.
Figure 3:
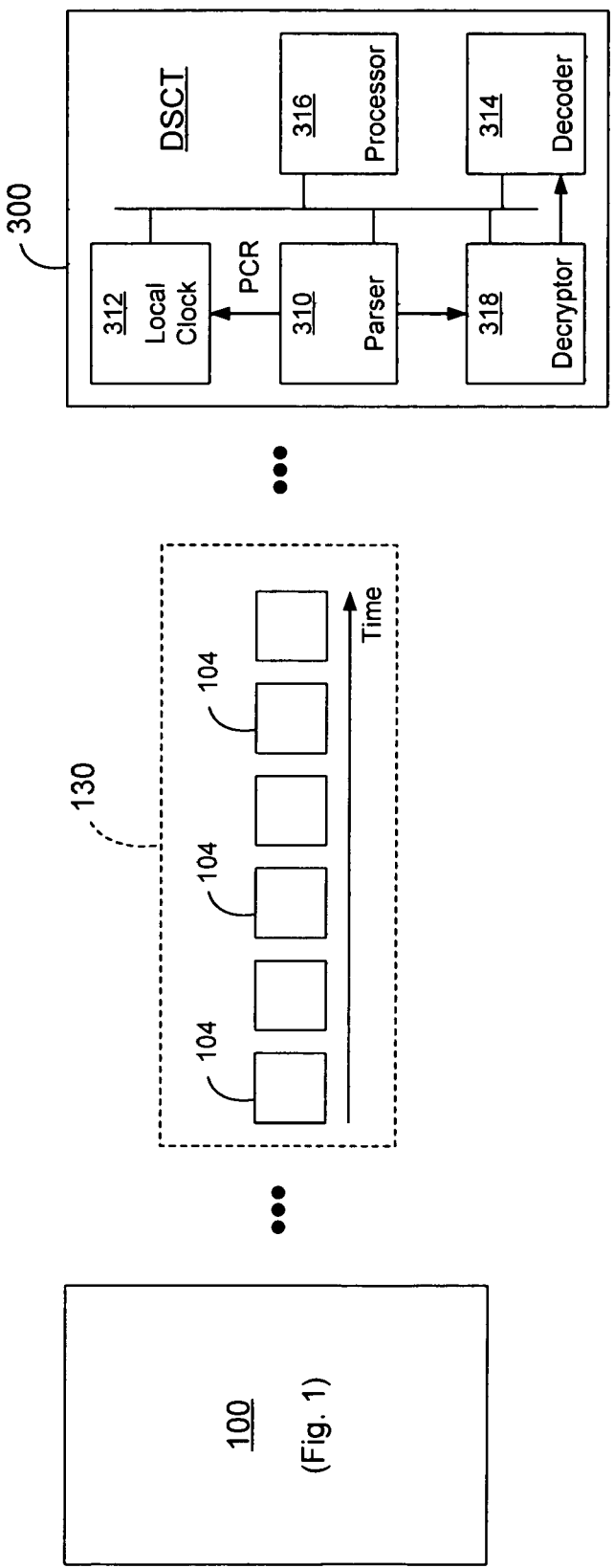
FIG. 3 illustrates one embodiment of a stream of transports packets transmitted to a digital subscriber communication terminal (DSCT).

As shown in FIG. 1, a transport stream transmitter 100 within the headend receives an asynchronous sequence of network frames 102. Due to network congestion and other factors, there are variable time gaps between network frames 102 that results in jitter. Each network frame 102 encapsulates multiple transport packets 104 (FIG. 2). However, the present invention is not limited to network frames carrying any particular number of transport packets. The transmitter 100 transmits a stream 106 of MPEG transport packets 104 to the DSCTs 300 (FIG. 3).

Still referring to FIG. 1, the transmitter 100 includes a processor 110, a clock 112, a pre-dejitterer 114, a plurality of dejitterers 116, a plurality of encryptors 118, a multiplexer 120 and a modulator 122. The pre-dejitterer 114 receives the stream of network frames 102 and de-encapsulates the transport packets 104 carried by the network frames 102. The pre-dejitterer 114 attaches a data unit header (DUH), which includes fields for carrying various processing, routing, and timing information, to the transport packets 104. The transport packets 104, with DUHs attached thereto, are then transmitted as jittered streams 106 to the dejitterers 116. The pre-dejitterer 114 receives processing instructions from the processor 110 so that each program stream carried in the stream of network frames 102 is transmitted to a separate dejitterer 116. The clock 112 generates the local time, and provides the dejitterers 116 and the multiplexer 120 with the current local time.

In the preferred embodiment, the pre-dejitterer 114 also calculates a clumping error estimate, E, which approximately compensates for the error introduced by clumping the multiple transport packets 104 into a single network frame 102. The clumping error estimate, E, is stamped into the DUH. The pre-dejitterer 114 also checks transport packets 104 for PCRs 240 (FIG. 2), and responsive to finding a PCR 240, the pre-dejitterer 114 stamps the timestamp carried in the PCR 240 in the DUH. Each one of the dejitterers 116 receives a jittered stream 106 of transport packets 104 and outputs a continuous dejittered stream 124 of transport packets. The details of the dejitterer 116 are provided hereinbelow.

The dejittered streams 124 are further processed by the encrypters 118, the multiplexer 120, and the modulator 122. The processing that is done to the dejittered streams 124 between the dejitterer 116 and the modulator 122 reintroduces jitter because, among other things, multiplexing introduces variable delay. The modulator 122 is adapted to transmit transport packets 104 without causing variable delay. Therefore, those skilled in the art recognize that any variable delay for a transport packet introduced by the processing that is done after the dejitterer 116 and before the modulator 122 may be compensated for and that the transport stream transmitter 100 can include different components, fewer components or more components than those shown in FIG. 1.

In regard to the processing before the dejitter 116, when the pre-dejitterer 114 finds a transport packet 104 having a PCR 240, the pre-dejitterer 114 reads and records the value of the timestamp field of the PCR 240. The pre-dejitterer 114 also records the error estimate, E, in the clumping error estimate field for that PCR bearing transport packet. The DUH also includes a time-in field in which the dejitterer 116 stamps the current local time, commonly referred to as the LCR, into the time-in field when the transport packet 104 is received at the dejitterer 116.

The DUH can also include, among other things, fields for carrying processing information and encryption information. In that case, the processor 110 provides the pre-dejitterer 114 with the processing and encryption information so that the pre-dejitterer 114 can stamp the information into the appropriate fields of the DUH.

Although the components of the stream dejitterer 116 are shown as separate elements, this has been done for the sake of clarity and is a non-limiting example. One or more of the components of the stream dejitterer 116 can be implemented in hardware, software, or firmware among others. In the embodiment shown in FIG. 2, the dejitterer 116 includes a PCR extractor 210, a dejitter buffer 212, an interval timer 214, a first locked loop 220, and a second locked loop 230. The first locked loop 220 includes a comparator 222, a loop filter 224, and a voltage controlled oscillator or clock 226. The second locked loop 230 includes a comparator 232, a signal limiter 234, and a voltage controlled oscillator or clock 236. The clock 236 of the second phase locked loop 230 is locked to the rate of the first phase locked loop 220.

The PCR extractor 210 receives an incoming transport stream 106 of a plurality of jittered transport packets 104 wherein at least a portion of the incoming packets 104 include a PCR 240 and a payload 242. As the incoming packets 104 arrive at the dejitterer 116, the packets 104 are timestamped with a LCR 244 based upon a local clock reference from the system local clock 112. The PCR 240 and the LCR 244 are read from the packets 104 before the packets 104 are placed in the dejitter buffer 212.

Whenever the DUH includes a timestamp in the PCR timestamp field, the PCR 240 and the LCR 244 are provided to first feedback loop 220, commonly referred to as a type II PCR recovery loop. The first locked loop 220 is provided a "corrected" input, PCR 250, which is given as $PCR = PCR_{IN} - E_{IN}$, where $PCR_{IN}$ is the timestamp originally carried in PCR 240 and $E_{IN}$ is carried in the clumping error estimate field of the incoming DUH. The output 252 generated by the first locked loop 220 is a variable rate timing signal stream, locked to the original system clock reference (SCR) which is fed back into the comparator 222. The variable rate timing signal stream is responsive to a variation in frequency (phase accumulation rate) and phase of the stream of timestamp values.

The comparator 222 determines the difference between its inputs, PCR 250 and PCR_recovered 252, respectively, and outputs the difference 254 to the loop filter 224. The loop filter 224 essentially smoothes or averages its input 254 to produce an output 256 that does not include high-frequency variations. The oscillator 226 receives the output 256 of the loop filter 224 and adjusts its rate accordingly. The oscillator 226 speeds up responses to positive input, slows down responses to negative input, and remains constant responsive to the input equally zero.

The output 252 of the first phase locked loop, PCR_recovered 252, is input to the second phase locked loop 230 consisting of comparator 232, signal limiter 234, summer 238 and voltage controlled oscillator or clock 236. The second locked loop 230, which tracks the first loop 220, conveys a stable rate timing signal stream of the average rate of the timing signal stream from the first loop 220, which will be used as the time base for packet removal from the dejitter buffer 212. In addition to having jitter below specified limits, the error between the output 262 of the second loop 230 and the PCR contained in the received packet must be small. In order for this error to be small when the source SCR frequency is different from the nominal PCR_local frequency (frequency of oscillator 236 with zero correction signal), the phase locked loop must be of type II (zero steady state error to a linearly changing input phase) or the nominal frequency of the oscillator must be steered through some external mechanism. In order for the jitter of the dejittered PCR_local 262 at the output of the second locked loop 230 to be below specified bounds, the rate of change of the rate control signal 268 must be limited. If a slew rate limiter were placed in the path of the control signal 268, the open loop response of the second phase locked loop 230 would be adversely affected to the point of instability (if loop 230 is a type II loop). However, the output 256 from the loop filter 224 of the first loop is the phase accumulation rate (frequency error between the encoder SCR and the nominal frequency of the oscillator producing PCR_recovered) required for the second loop 230 (oscillators 226 and 236 have the same nominal frequency and tuning sensitivity).

The output 256 is used as a feedforward signal to steer the nominal frequency of the oscillator 236 in the second phase locked loop 230 which is a type I loop. This feedforward signal 256 can be slew-rate limited by a slew rate limiter 228 in path 258 which is not within a feedback loop. With this signal present, the oscillator 236 in the second loop 230 is steered to the correct nominal frequency so that the second loop 230 is only required to compensate for the initial phase error between its output and the output of the first loop 220. By limiting the magnitude of the loop error signal 264 (and only updating its output periodically) in signal limiter 234 and summing this with the rate limited steering signal 258 in summer 238, the rate of change of control signal 268 is limited.

The comparator 232 determines the difference between its inputs from the first locked loop 220 and PCR-local 262 generated by the controlled oscillator 236 of the second locked loop 230. The comparator 232 outputs the difference 264 to the signal limiter 234 which limits the magnitude of the input 264 to generate output 266 to summer 238.

The output PCR_local 262 from the oscillator 236 of the second locked loop 230 is provided to another summer 270. The summer 270 subtracts an adjustable parameter β that represents the average time that a transport packet 104 resides in the buffer 212. The result is used in conjunction with the interval timer 214 to control the rate at which transport packets are output. Transport packets 104 bearing PCR time stamps are re-stamped with PCR_Local Delayed 294 from the clock 238 plus β from the summer 270 of the second locked loop 230.

Still referring to FIG. 2, the first and second feedback loops 220, 230 together control the interval timer 214 without the need for the second locked loop 230 being a type II loop. Feeding forward the output 256 from the first loop filter 224 through the slew rate limiter 228 limits how quickly frequency can change and, therefore guarantees that the upper bound of output jitter will not be exceeded. The rate limiting function fed forward from the first locked loop 220 turns the second locked loop 230 into a non-linear adaptive system because the bandwidth of the system changes as a function of the amount of jitter in the input stream.

The output of the second feedback loop 230 is used as the time base and, therefore, is provided to the output process that removes packets 104 from the dejitter buffer 212 based upon the dejittered PCR. As shown in block 280 of FIG. 2, the output process removes packets 104 from dejitter buffer 212 based upon the expiration of the interval timer 214. The interval timer time interval is calculated in a manner that provides a constant packet interval between MPEG stream PCRs. A packet is released at the expiration of each interval timer diminishing count. Successive diminishing counts are decremented responsively to the stable rate timing signal stream from loop 230. Because the timer interval is referenced to the recovered PCR, the packets 104 will be removed at a rate equal to that of the original server, thereby re-establishing the original time base of a selected program. As shown by blocks 282 and 284 of FIG. 2, the PCR timestamp values within the dejittered packets 104 are replaced with an updated PCR timestamp.

As shown in FIG. 3, one embodiment of the DSCT 300 includes, among other things, a parser 310, a local clock 312, a decoder 314, a processor 316, and a decryptor 318. The parser 310 provides the processor 316 with the PATs and PMTs within the stream 130. The processor 316 uses the PAT to determine the PMT for a particular program and then uses the PMT for the particular program to determine the PID streams of the particular program including the PCR PID stream. The parser 310 provides the local clock 312 with timestamps carried in the PCR 240. In addition, the parser 310 provides the PID streams of the particular program to the decryptor 318.

Responsive to the processor 316 determining the DSCT 300 has been entitled to access the program, the processor 316 provides the control words to the decryptor 318 for decrypting the program. The decryptor 318 then uses the control words to decrypt the encrypted payloads of the transport packets 104 carrying the program and provides the decrypted payload to the decoder 314.

The local clock 312 receives the timestamps and uses the timestamps to lock its frequency to match the frequency of the encoder at the headend that encoded the program. With the local clock 312 matching the frequency of the encoder, the decoder uses timing signals from the local clock 312 to synchronize the various elementary streams of the program.

Figure 4:
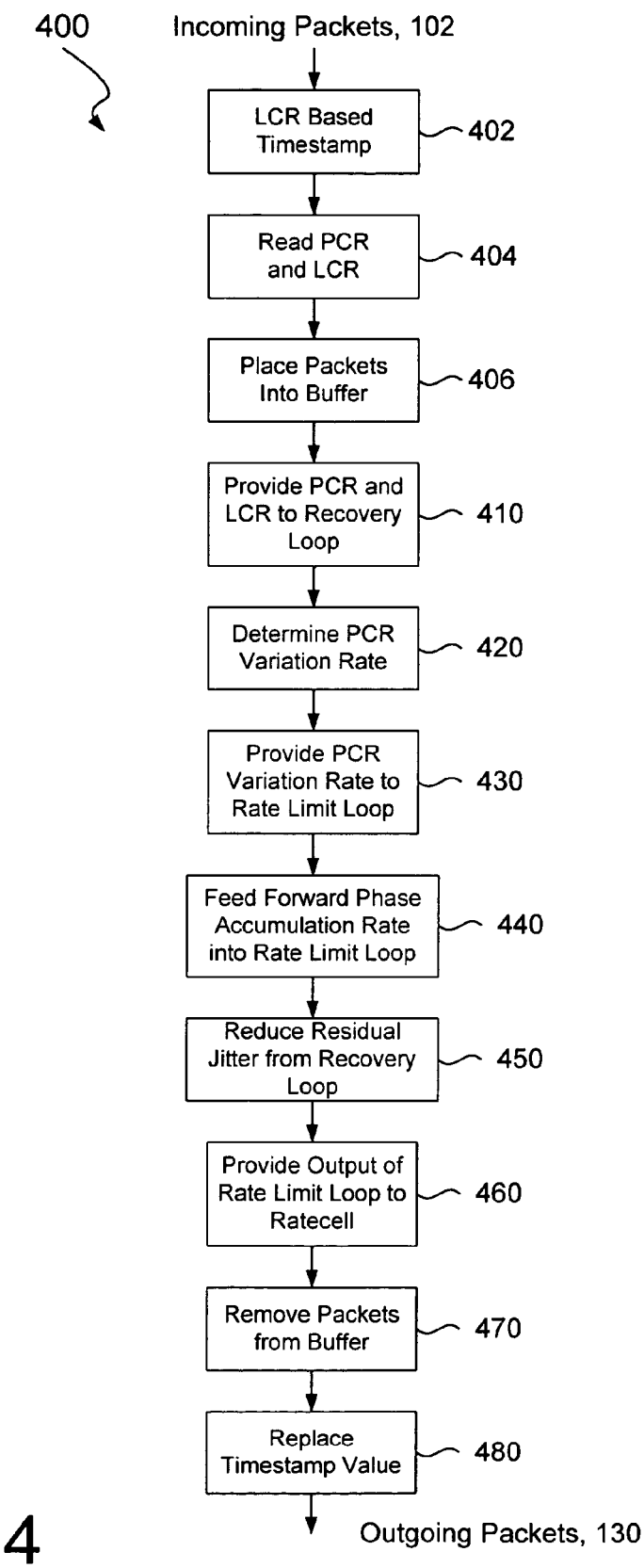
FIG. 4 is one embodiment of a flow chart for implementing the process for dejittering a stream of packets according to the present invention.

FIG. 4 illustrates exemplary steps of a process 400 taken by the transport stream transmitter 100 for implementing the present invention. The transport stream transmitter 100 receives an incoming stream 102 having transport packets 106 where some of which bear time stamp PCR 240. As shown in process block 402, the incoming packets 104 are time stamped with the LCR 244. The PCR 240 and LCR 244 are read from the packets 104 that have a DUH, as shown in process block 404, and are then placed into the dejitter buffer 212 as shown in process block 406. Next, the PCR 240 and the LCR 244 are provided to the first locked loop 220 as shown in process block 410 to determine the PCR variation rate as shown in process block 420. Process block 430 depicts providing the PCR variation rate to the second locked loop 230. The phase accumulation rate from the first locked loop 220 is fed forward into the second locked loop 230 as depicted in process block 440 which results in a reduction of residual jitter from the first locked loop 220.

Next, as shown in process block 460, the output of the second locked loop 230 is provided to the interval timer 214. The packets 104 are released from the dejitter buffer 212, as shown in process block 470, based upon the expiration of the interval timer 214 which is relative to the output of the clock 236 of the second locked loop 230. The extracted transport packets 104 are further processed in the transport stream transmitter 100 which can result in variable delay thereby re-introducing jitter. In such case, transport packets 104 bearing PCR time stamps are re-stamped with a time measured relative to the clock 236 of the second locked loop 230, as shown in process block 480. The transport packets 104 are then transmitted from the transport stream transmitter 110 in stream 130 to the subscriber's DSCT 300.

Any process descriptions or blocks in flow charts should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention The foregoing has broadly outlined some of the more pertinent aspects and features of the present invention. These should be construed to be merely illustrative of some of the more prominent features and applications of the invention. Other beneficial results can be obtained by applying the disclosed information in a different manner or by modifying the disclosed embodiments. Accordingly, other aspects and a more comprehensive understanding of the invention may be obtained by referring to the detailed description of the exemplary embodiments taken in conjunction with the accompanying drawings, in addition to the scope of the invention defined by the claims.

What is claimed is:

1. A method for guaranteeing an upper bound on output jitter while maintaining maximum loop bandwidth, said method comprising the steps of:
   receiving a plurality of transport packets wherein each of at least a portion of said plurality of transport packets includes a first timestamp value therein;
   generating a stream of said first timestamp values;
   generating a variable rate timing signal stream conveying the average rate of said first timestamp values; and
   generating a stable rate timing signal stream conveying the average rate of said variable rate timing signal stream.

2. The method of claim 1 further comprising the step of releasing said transport packets from a buffer responsive to said stable rate timing signal stream.

3. The method of claim 1 wherein said step of generating a variable rate timing signal stream is responsive to a variation rate and a phase accumulation rate of said stream of said first timestamp values.

4. The method of claim 3 wherein said step of generating a stable rate timing signal stream is responsive to said phase accumulation rate of said stream of said first timestamp values.

5. The method of claim 4 wherein said step of generating a stable rate timing signal stream is responsive to feeding forward said phase accumulation rate of said stream of said first timestamp values.

6. The method of claim 5 further comprising the step of limiting the rate of change of said phase accumulation rate of said stable rate timing signal stream as a result of feeding forward said phase accumulation rate of said stream of said first timestamp values.

7. The method of claim 5 further comprising the step of slew rate limiting said feed forward phase accumulation rate of said stream of said first timestamp values.

8. The method of claim 1 further comprising the step of releasing said transport packets from a buffer responsive to said stable rate timing signal stream with a constant interval between said transport packets.

9. The method of claim 1 further comprising the steps of providing said stable rate timing signal stream to a interval timer, and providing a constant interval between said transport packets based upon expiration of said interval timer when releasing said transport packets from a buffer.

10. The method of claim 1 further comprising the step of maintaining successive diminishing counts decremented responsively to said stable rate timing signal stream.

11. The method of claim 1 further comprising the step of generating second timestamp values responsive to said stable rate timing signal stream for replacing said first timestamp values.

12. The method of claim 1 wherein said variable rate timing signal stream is generated in a type II phase locked loop and said stable rate timing signal is generated in a type I phase locked loop.

13. The method of claim 1 wherein the transport packets convey Motion Picture Experts Group (MPEG) data and the first timestamp values are Program Clock Reference (PCR) values.

14. A system for guaranteeing an upper bound on output jitter while maintaining maximum loop bandwidth, said system comprising:
   a plurality of transport packets wherein each of at least a portion of said plurality of transport packets includes a first timestamp value therein;
   a buffer for storing said plurality of transport packets;
   a first loop for receiving a stream of first timestamp values and generating a variable rate timing signal stream conveying a variation rate and a phase accumulation rate of said first timestamp values to said first loop; and
   a second loop for receiving said variable rate timing signal stream and generating a stable rate timing signal stream conveying the average rate of said variable rate timing signal stream.

15. The system of claim 14 further comprising a interval timer responsive to said stable rate timing signal stream to release said transport packets from said buffer such that said interval timer provides a constant interval between said transport packets based upon expiration of said interval timer.

16. The system of claim 14 wherein said stable rate timing signal stream is responsive to said phase accumulation rate being feed forward from said first loop to said second loop.

17. The system of claim 14 wherein said second loop is limited by a slew rate limiter outside of said second loop.

18. The system of claim 14 further comprising a slew rate limiter outside of said second loop to limit said stable rate timing signal stream as a result of feeding forward said phase accumulation rate of said stream of said first timestamp values.

19. The system of claim 14 further comprising second timestamp values to replace said first timestamp values generated in response to generating said stable rate timing signal stream.

20. The system of claim 14 wherein said variable rate timing signal stream is generated by a voltage controlled oscillator in a type I phase locked loop and said stable rate timing signal stream is generated by a voltage controlled oscillator in a type II phase locked loop.

* * * * *